July 6, 1965 L. F. ROBERTSON ETAL 3,193,268
MULTI-PORT REGENERATIVE GLASS MELTING FURNACE
Filed Oct. 13, 1960 3 Sheets-Sheet 2
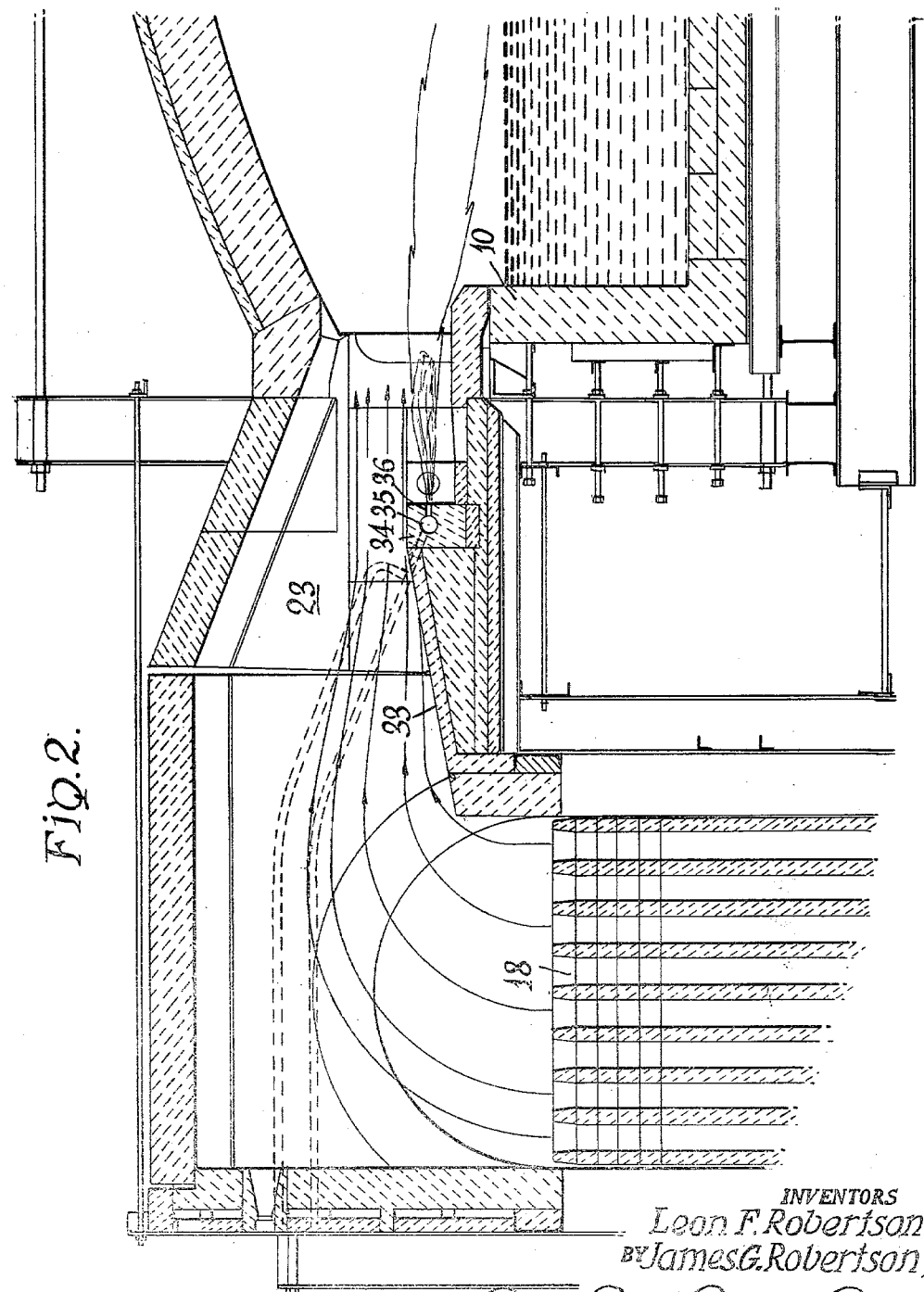
INVENTORS
Leon F. Robertson &
BY James G. Robertson,
Bean, Brooks, Buckley & Bean
ATTORNEYS.

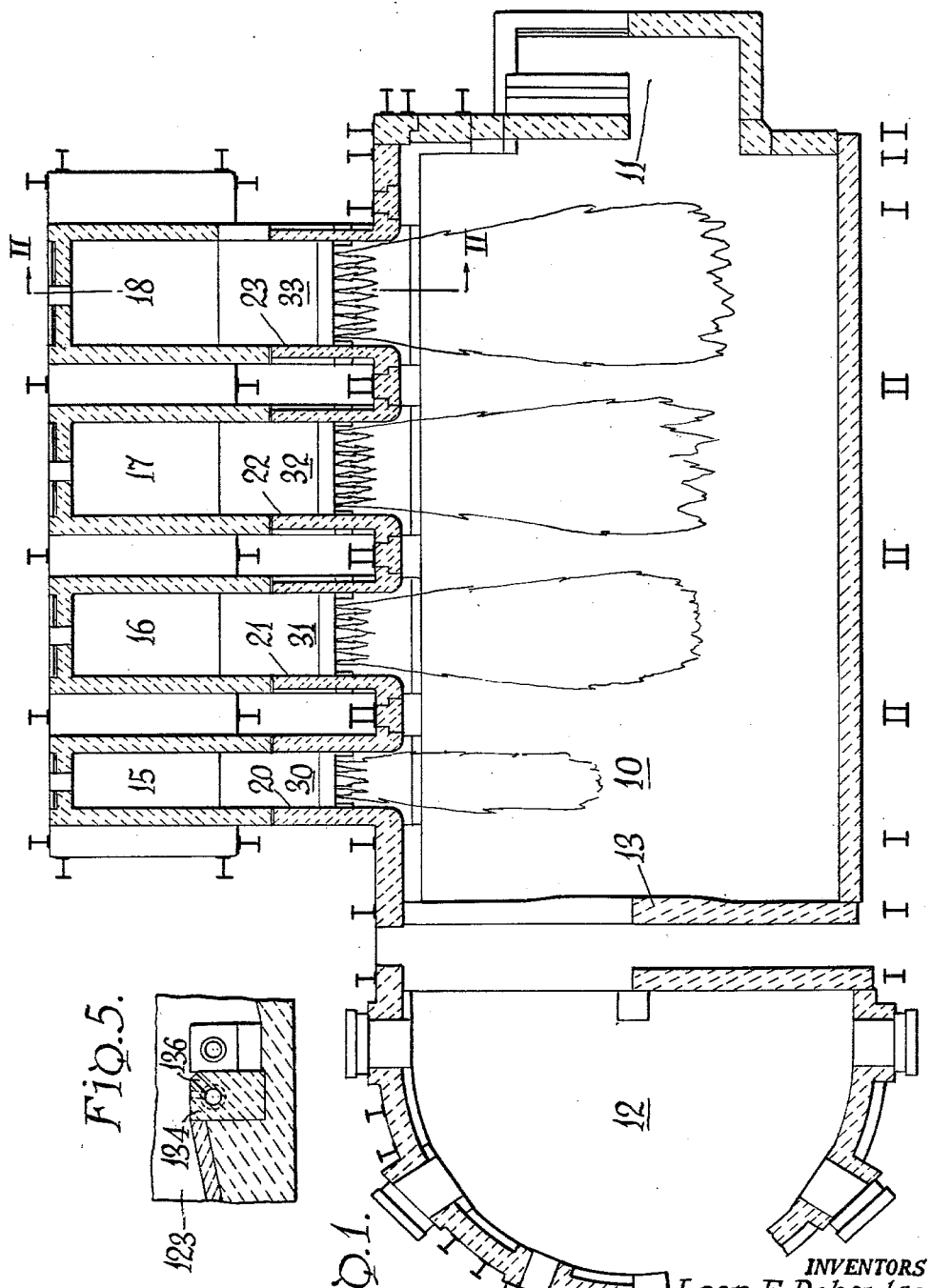

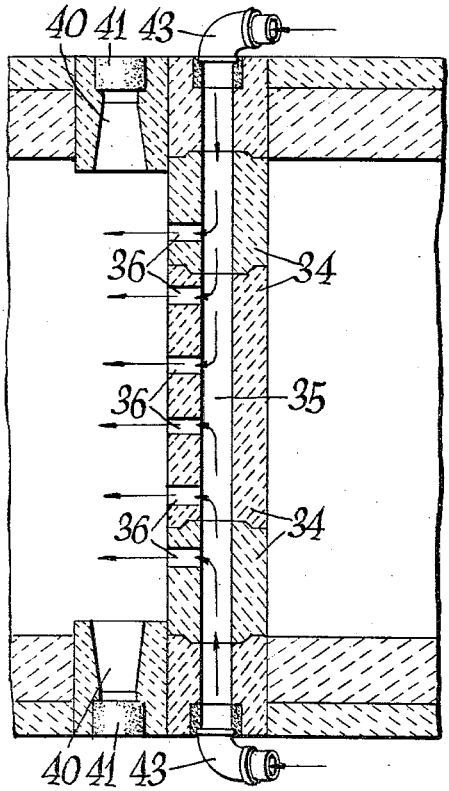
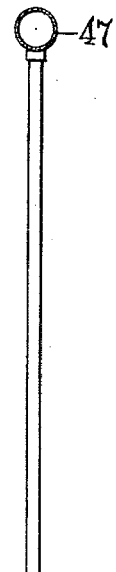
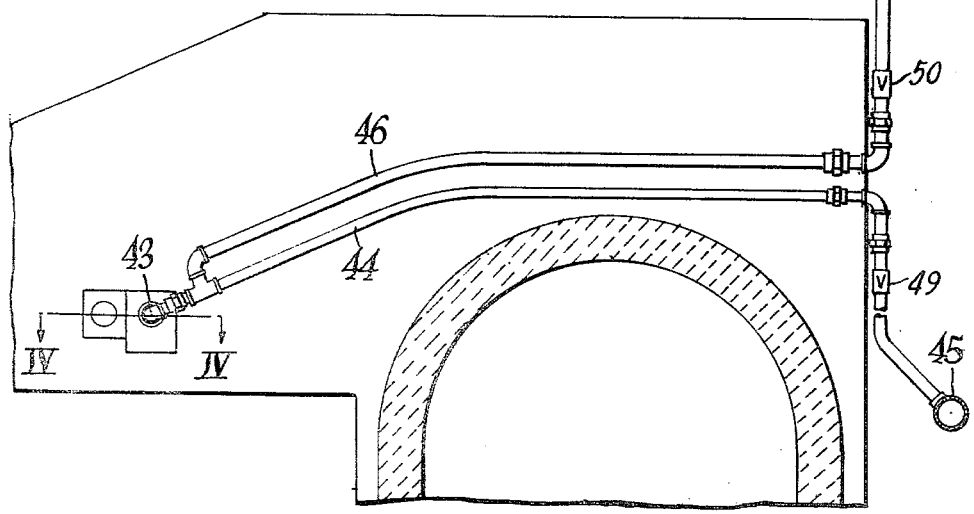
INVENTORS
Leon F. Robertson &
BY James G. Robertson,
ATTORNEYS.

United States Patent Office 3,193,268
Patented July 6, 1965

3,193,268
MULTI-PORT REGENERATIVE GLASS
MELTING FURNACE
Leon F. Robertson and James G. Robertson, Brockway,
Pa., assignors to Brockway Glass Company, Inc.,
Brockway, Pa.
Filed Oct. 13, 1960, Ser. No. 62,417
4 Claims. (Cl. 263—49)

This invention relates to glass melting furnaces and particularly to a novel port arrangement for introducing combustible gaseous fuel mixtures to such furnaces.

A common type of glass melting furnace is that known as a tank furnace which has a generally rectangular tank or hearth portion wherein the raw batch materials are introduced more or less continuously at one end and molten glass is drawn from the other end. The present invention relates particularly to "cross flame" furnaces of this general type. Such furnaces are provided with a number of ports along one or both sides of the furnace for introducing fuel and air. The mixture ignites continuously and plays directly upon and across the surface of the raw batch material and the molten glass in the tank or hearth.

Perhaps the most common of the tank furnaces is the regenerative tank furnace wherein the flame gases, having spent their directly usable heat at the interior of the furnace, pass through the ports at the other side and over regenerators usually in the form of refractory checker chambers. The outgoing gases thus give up substantial parts of their remaining heat to the checkers as they pass thereover and at regular intervals the direction of flow of air is reversed so that the incoming air is heated by passing over the hot checkers in the regenerator at one side of the furnace while the checkers at the other side are being heated by exhausting products of combustion.

In recuperative furnaces wherein the principles of the present invention may also be employed the operation is not cyclic but the multiple port arrangement along a side of the furnace for directing flames over and against the surface of the raw batch and the melting and molten glass in a direction transverse to the flow of glass from the feed end to the discharge end of the tank may be similar to that of the regenerative furnaces referred to above.

The ports through which the fuel and air constituents flow to the interior of the furnace proper are of considerable width, there being of the general order of four or five ports arranged along each side of a regenerative glass melting tank furnace in a commercial glass manufacturing installation. These ports may be of the general order of six feet in width measured along the length of the tank proper and with increasing furnace sizes may substantially exceed that size.

In natural gas fired furnaces, as distinguished from producer gas fired furnace, the usual and accepted mode of introducing the gaseous component of the fuel mixture to each port is by way of discharge passages which open into the side walls of each port so that the gas is projected into the air stream in a direction transverse to the direction of air flow. While this mode of introduction of combustible gas to the air flowing through each port to the furnace proper is well known and widely practiced, it has the disadvantage that the distribution of combustible gass in the flow of gas-air mixture to the furnace is not uniform throughout the width of each port.

Such lack of uniformity is aggravated by increasing port widths and, with gas entering the port from opposite sides thereof, results are rendered even more haphazard by inevitable variations in the pressure of the entering gas whereby the same jets across the port to a greater or less degree. At high pressures fuel gas may jet from opposite sides of the port toward the center thereof and may actually be predominant at the center, whereas at lower pressures very little of the combustible gas may reach the center of the port, the more highly combustible mixtures being found along the side walls of each port.

The problem of introducing fuel gas in such a way as to insure substantial uniformity of distribution thereof with respect to the air from the regenerators is aggravated in furnaces using natural gas in which case the volume of the air is roughly ten to twelve times as great as the volume of gas. A relatively open and clear air passage is required to handle the necessary volume of air and also to permit the air to retain a maximum amount of heat from the regenerators and therefore the problem is to introduce the much lesser volumes of fuel gas in such a way that they will be more or less uniformly distributed with respect to the air volume without interfering with the free flow of the latter either by physical obstruction or by creating undesirable turbulence.

While mixing of fuel gas and air by turbulence is often desirable, such mixture and turbulence does not always produce optimum results under conditions which may prevail in glass melting furnaces of the type here under consideration. It is desirable that the issuing flame propagate with a certain degree of retardation as the flow of air and gas projects outwardly into the furnace proper and across the surface of the glass. For this reason it may be desirable to project the fuel gas component in a direction parallel to the movement of air but in such a manner and in such a condition that uniform contact between the two will result even though they are projected in such a manner that there is very little turbulence and the two components are initially projected with a substantial degree of independence of flow. This results in a long and uniform flame propagation.

Since a certain amount of turbulence is inevitable, and due to other aerodynamic phenomena, a certain amount of mixing of air and gas takes place as soon as the two constituents are caused to flow in the same passage. Accordingly, to secure the uniform gas-air relationship which is basic in the present invention, it is essential that all of the fuel gas issue into contact with the air stream under conditions which are as uniform as can be, both as to direction and as to the point of contact with respect to the distance from the interior of the furnace proper.

Due to variations in combustibility of the fuel gas, varying temperatures and flow rates of the incoming air, and other variable conditions, the optimum rate of mixture of the air and gas will vary. More direct contact may be attained by inclining the horizontal row or bank of fuel gas inlet passages so that the flat curtain or sheet of fuel gas which they introduce flows upwardly toward and against the incoming overlying air, the inclination being varied to suit the above variable conditions and to vary the length of flame propagation.

Accordingly, the present invention provides a fuel gas delivery arrangement wherein a single continuous face extending across each port is provided with a plurality of equally spaced and uniformly sized openings whereby gas issuing therefrom forms a sheet or curtain of gas as nearly uniform as possible considered across the curtain, that is across the full width of each port, and of a fixed length from the face from which the gas passages emerge to the furnace proper.

By admitting fuel gas to the furnace port from a number of gas passages ranging uniformly across the port, it is possible to admit the gas at relatively low velocity so that it flows toward the furnace as a layer or stratum of air. Combustion occurs at the boundary between the gas and air layers and burning continues across the top of the molten material in the tank as the initial burning promotes admixture of the air and fuel above and below the boundary layer.

Thus a long and very effective flame lying close to the surface of the glass and extending the full width of the port and well across the surface of the glass outwardly of the port is produced. By this method of combustion control the combustion tends to be greater in the lower half of the space above the furnace charge where the most intense heat is developed while the air and fuel gas adjacent to the burning boundary layer are heated by the combustion prior to actual combustion of these adjacent constituents.

The present invention provides a novel port arrangement wherein a clear open air port or passage of the desired size is utilized, even where the width of such port may be, as indicated above, six feet or even considerably more. A relatively low ledge is formed across the bottom of the port with the upright surface of the ledge facing toward the furnace, that is, toward the direction of flow of the air, and a continuous row of relatively small uniformly spaced gas ports or passages emerge from the face of the ledge in the general direction of air flow and in such a way that the somewhat converging flow of air toward the interior of the furnace proper flows over a horizontal uniform curtain or sheet of fuel gas issuing from the aforesaid series of ports, thus insuring substantially absolute uniformity of air-fuel contact and a uniform air-fuel ratio throughout the throat of each port and a consequent uniform flame projecting across the surface of the material in the tank of the furnace.

Representative embodiments of the principles of the present invention are illustrated in the accompanying drawings and described in the following specification but it is to be understood that such embodiments are set forth for the purpose of illustrating the principles of the present invention and that various mechanical modifications and variations may be introduced without departing from the spirit of the invention, the scope of which is limited only as defined in the appended claims.

In the drawings:

FIG. 1 is a fragmentary horizontal cross-sectional view through one form of tank furnace embodying the principles of the present invention, the upper portion of the cross-section being taken at an elevation extending through the fuel-air ports and the lower portion being taken at a lower elevation through the melting tank proper;

FIG. 2 is a fragmentary transverse cross-sectional view through one of the fuel-air ports at the left-hand side of the furnace, as viewed from the delivery end, taken approximately on the line II—II of FIG. 1;

FIG. 3 is a fragmentary elevational view partly in cross-section showing one of the ports viewed in the same direction as FIG. 2 but at the right-hand side of the furnace;

FIG. 4 is a fragmentary horizontal cross-sectional view through a fuel gas passage portion of the apparatus taken approximately on the line IV—IV of FIG. 3; and FIG. 5 is a fragmentary view taken similarly to FIG. 2 showing a modified fuel gas passage arrangement.

Throughout the several figures of the drawings, like characters of reference denote like parts and, referring to FIG. 1, the numeral 10 designates the glass melting tank of a tank furnace. Tank 10 is provided at one end with a batch receiving "doghouse" 11 and at its other end with a working chamber or nose 12, the latter being separated from the tank proper at the lower portion by a conventional bridge wall structure 13.

A series of regenerators or checker chambers is designated by the numerals 15 through 18 in FIG. 1 and one of the checker chambers, that designated 18, is shown in vertical cross-section in FIG. 2. As in conventional regenerative furnaces a similar series of checker chambers or regenerators is provided at the opposite side of tank 10 and the flow of air used to support combustion is periodically reversed in a well known and conventional manner.

When the air flow is from left to right, as viewed in FIG. 2, air for combustion passes through the regenerators 15 through 18 and thence through a series of horizontal ports designated 20 through 23, respectively, which lead to the furnace proper. In the form of the invention shown herein the roof portions of the ports 20 through 23 slant downwardly toward the tank 10 to provide a converging air passage through each port and the ports 20 through 23 are provided with inclined bottom walls or ramp portions designated 30 through 33, respectively.

Each of the ramps 30 through 33 terminates in the direction of the tank 10 in a vertical ledge and refractory blocks 34 disposed against the several ledges form in effect short continuations of the ramps 30 through 33. The several blocks 34 are longitudinally bored as shown at 35 in FIGS. 2 and 4 and a series of individual horizontal gas emitting passages 36 lead from each bore 35 to the vertical faces of blocks 34 which form the terminal portions of each of the ramps 30 through 33. Passages 40 provided in each side wall of each of the ports, as shown in FIG. 4, are normally plugged as at 41 and are provided merely for clean-out purposes.

The converging or constricting passageway through each of the ports 20 through 23 formed by the inclined upper and lower walls tends to induce the flow of fuel gas from the passages 36 which in effect augments the rate of gas discharge therefrom in proportion to the rate of air flow through each of the ports 20 through 23.

This induction effect and the resultant gas flow is substantially uniform across each of the ports due to the rectangular cross-section of each port, the multiple uniformly spaced gas inlet passages, and the arrangement of the series of passages along a single vertical transverse face whereby each passage has an identical geometrical relation to the air flow passage and is the same distance from the point where the air and fuel gas discharge into the melting chamber.

Combustion gas in the present instance in the form of natural gas is introduced to each of the horizontal passages 36 by piping 43 which is in sealed communication with each end of each bore 35, likewise as clearly shown in FIG. 4.

In FIG. 3 the numeral 44 shows a natural gas supply pipe for each port leading to the piping 43 from a natural gas supply manifold 45 and the numeral 46 designates a pipe leading to each of the piping connections 43 from a manifold 47 which supplies inert gas, preferably in the form of spent flue gas from the furnace stack. Valves designated 49 and 50, respectively, are provided in the natural gas supply pipe 44 and the inert gas supply pipe 46 for manually regulating the relative quantities of these gases passing to the piping 43.

The introduction of this more or less inert gas into each of the natural gas supply conduits is for the purpose of controlling flame propagation and flame length by controlling the degree of combustibility of the gas entering the several ports through the passages 36.

The division walls between the several ports in a multiport furnace create inevitable breaks in the continuity of flame coverage and such breaks may be minimized by the use of substantially wider ports. In prior art arrangements the use of wider ports has been militated against by the inability to secure uniform fuel gas distribution and uniform flame propagation across such ports. The multiple gas passage arrangement of the present invention insures substantially uniform fuel gas distribution and substantially uniform flame propagation throughout the width of each individual port regardless of the width of such port. Accordingly, the widths of individual ports may be increased substantially at will in the design of glass molding furnace constructed in accordance with the principles of the present invention.

Referring to the modification illustrated in FIG. 5, the furnace structure is identical in all respects to the embodiment previously described excepting that the horizontal row of fuel gas discharge passages 136 in the refractory blocks 134 are inclined upwardly to discharge the sheet or curtain of fuel gas more directly against the overlying body of incoming air in the port 123. This inclination may be varied from the horizontal direction illustrated in the principal embodiment to a nearly vertical direction, to suit various conditions referred to previously herein and to regulate thereby the rate of admixture as between the fuel gas and the incoming combustion air.

We claim:

1. In a continuous glass melting furnace of the cross-fired type having an oblong melting tank with a batch feeding end and a molten glass discharge end, a series of ports along a side of said tank for conducting combustion air thereto, said ports discharging generally horizontally into the interior of the melting tank above the level of the glass charge therein, the upper and lower walls of each port converging toward said tank and the lower wall terminating a substantial distance short of the tank proper in a generally vertical depending face extending continuously substantially entirely across said port, a ledge extending from the base of said depending face to said melting tank, a plurality of relatively small uniformly spaced openings extending across said face to discharge fuel gas in a horizontal direction substantially directly toward the melting tank along said ledge to form a horizontal curtain or stratum of fuel gas at the base of each port with the combustion air flowing toward the melting tank over said stratum.

2. In a continuous glass melting furnace of the cross-fired type having an oblong melting tank with a batch feeding end and a molten glass discharge end, port means along a side of said tank for conducting combustion air generally horizontally thereto, said port means discharging into the interior of the melting tank above the level of the glass charge therein, the lower wall of said port means terminating a substantial distance short of the tank proper in a generally vertical depending face extending continuously substantially entirely across said port means, a ledge extending from the base of said depending face to said melting tank, a plurality of relatively small uniformly spaced openings extending across said face to discharge fuel gas in a direction generally toward the melting tank along said ledge and form a horizontally uniform curtain or stratum of fuel gas at the base of each port.

3. In a continuous glass melting furnace of the cross-fired type having an oblong melting tank with a batch feeding end and a molten glass discharge end, a series of ports along a side of said tank for conducting combustion air thereto, said ports discharging generally horizontally into the interior of the melting tank above the level of the glass charge therein, the upper and lower walls of each port converging toward said tank and the lower wall terminating a substantial distance short of the tank proper in a generally vertical depending face extending continuously substantially entirely across said port, a ledge extending from the base of said depending face to said melting tank, passage means extending uniformly across said face and formed to discharge gas in a horizontal curtain or stratum at the base of each port and along said ledge, means for delivering a mixture of fuel gas and relatively inert gas to said passage means, and means for regulating the proportion of fuel gas and inert gas to regulate the intensity of combustion.

4. In a continuous glass melting furnace of the cross-fired type having an oblong melting tank with a batch feeding end and a molten glass discharge end, port means along a side of said tank for conducting combustion air generally horizontally thereto, said port means discharging into the interior of the melting tank above the level of the glass charge therein, the lower wall of said port means terminating a substantial distance short of the tank proper in a generally vertical depending face extending continuously substantially entirely across said port means, a ledge extending from the base of said depending face to said melting tank, passage means extending uniformly across said face and formed to discharge gas in a horizontal curtain or stratum at the base of said port means and along said ledge, means for delivering a mixture of fuel gas and relatively inert gas to said passage means, and means for regulating the proportion of fuel gas and inert gas to regulate the intensity of combustion.

References Cited by the Examiner

UNITED STATES PATENTS

| 1,828,830 | 10/31 | Crowley | 263—15 |
| 1,828,833 | 10/31 | Drake | 263—15 |
| 2,179,848 | 11/39 | Forter | 263—15 |
| 2,401,640 | 6/46 | Hess et al. | 158—7.5 |
| 3,052,456 | 9/62 | Pugsley et al. | 263—15 |

WILLIAM F. O'DEA, *Acting Primary Examiner.*

IVAN R. LADY, PERCY L. PATRICK, ROBERT A. O'LEARY, CHARLES SUKALO, *Examiners.*